United States Patent
Oteri et al.

(10) Patent No.: US 12,120,674 B2
(45) Date of Patent: Oct. 15, 2024

(54) SYSTEM AND METHODS FOR DYNAMIC SCHEDULING IN NEW RADIO WITH BASE STATION

(71) Applicant: Apple Inc., Cupertino, CA (US)

(72) Inventors: Oghenekome Oteri, Cupertino, CA (US); Chunxuan Ye, Beijing (CN); Dawei Zhang, Cupertino, CA (US); Chunhai Yao, Beijing (CN); Haitong Sun, Cupertino, CA (US); Hong He, Cupertino, CA (US); Seyed Ali Akbar Fakoorian, Cupertino, CA (US); Sigen Ye, Cupertino, CA (US); Wei Zeng, Cupertino, CA (US); Weidong Yang, Cupertino, CA (US); Yushu Zhang, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/598,231

(22) PCT Filed: Aug. 5, 2020

(86) PCT No.: PCT/CN2020/107216
§ 371 (c)(1),
(2) Date: Sep. 24, 2021

(87) PCT Pub. No.: WO2022/027368
PCT Pub. Date: Feb. 10, 2022

(65) Prior Publication Data
US 2023/0156693 A1 May 18, 2023

(51) Int. Cl.
*H04W 72/1268* (2023.01)
*H04W 72/23* (2023.01)
(Continued)

(52) U.S. Cl.
CPC ....... *H04W 72/1268* (2013.01); *H04W 72/23* (2023.01); *H04W 74/0816* (2013.01); *H04W 74/0866* (2013.01)

(58) Field of Classification Search
CPC ................. H04W 28/04; H04W 72/04; H04W 72/042; H04W 88/08; H04W 72/1268;
(Continued)

(56) References Cited

U.S. PATENT DOCUMENTS

| | | | | |
|---|---|---|---|---|
| 2019/0104515 A1* | 4/2019 | Li | .......................... | H04L 1/1887 |
| 2020/0052831 A1* | 2/2020 | Yang | ..................... | H04L 5/0094 |
| 2020/0336193 A1* | 10/2020 | Park | ....................... | H04W 76/28 |
| 2021/0006456 A1* | 1/2021 | Kim | .................... | H04L 41/0668 |
| 2021/0219329 A1* | 7/2021 | Zhou | ....................... | H04L 1/189 |
| 2022/0132342 A1* | 4/2022 | Kim | .................. | H04W 74/0816 |

(Continued)

FOREIGN PATENT DOCUMENTS

| | | | | |
|---|---|---|---|---|
| CN | 106304347 A | * | 1/2017 | ............ H04W 72/04 |
| WO | WO 2018/174677 A1 | * | 9/2018 | ............ H04W 72/02 |

(Continued)

OTHER PUBLICATIONS

3GPP TSG RAN WG1 #97, Reno, USA, May 13-17, 2019, R1-1906224, Source: NTT Docomo, Inc., Enhancements on multi-TRP/panel transmission, Agenda Item: 7.2.8.2. (Year: 2019).*

(Continued)

*Primary Examiner* — Peter G Solinsky
*Assistant Examiner* — Sanjay K Dewan
(74) *Attorney, Agent, or Firm* — Womble Bond Dickinson (US) LLP

(57) ABSTRACT

Dynamic scheduling can be performed by 5G new radio in the licensed or unlicensed band. A base station can poll user equipment (UE) by transmitting a downlink control information (DCI) or other downlink communication that indicates resources that a UE can use to send a scheduling
(Continued)

request. The resources are dynamic, e.g., they can be updated and allocated to UEs based on network conditions. Other aspects are described.

20 Claims, 8 Drawing Sheets

(51) Int. Cl.
*H04W 74/08* (2024.01)
*H04W 74/0816* (2024.01)

(58) Field of Classification Search
CPC ............. H04W 72/23; H04W 74/0816; H04W 74/0866; H04L 5/0007
USPC .......................................................... 370/329
See application file for complete search history.

(56) References Cited

U.S. PATENT DOCUMENTS

2022/0377758 A1* 11/2022 Nurmela ............... H04B 7/0452
2023/0156704 A1* 5/2023 Wang .................... H04L 1/1861
370/329

FOREIGN PATENT DOCUMENTS

WO WO 2018/199704 A1 * 11/2018 ........... H04B 7/0417
WO WO 2020/033941 A1 * 2/2020 ............ H04W 72/12

OTHER PUBLICATIONS

3GPP TSG RAN WG1 Meeting #96bis, Xi"an, China, Apr. 8-12, 2019, R1-1903927, Agenda item: 7.2.2.1.3, Source: Huawei, HiSilicon, Title: UL channels and signals in NR unlicensed band. (Year: 2019).*
3GPP, "3rd Generation Partnership Project; Technical Specification Group Radio Access Network; NR; NR and NG-RAN Overall Description; Stage 2, (Release 16)," Technical Specification, 3GPP TS 38.300, V16.2.0, Jul. 24, 2020, 148 pages.
European Search Report and Search Opinion received for European Application No. 20948656.2, mailed on Mar. 14, 2024, 10 pages.
International Preliminary Report on Patentability received for PCT Patent Application No. PCT/CN2020/107216, mailed on Feb. 16, 2023, 5 pages.
International Search Report and Written Opinion received for PCT Patent Application No. PCT/CN2020/107216, mailed on Mar. 25, 2021, 6 pages.

* cited by examiner

SYSTEM AND METHODS FOR DYNAMIC SCHEDULING IN NEW RADIO WITH BASE STATION

RELATED APPLICATIONS

The present application is the national phase of International Application No. PCT/CN2020/107216, filed on Aug. 5, 2020, and the disclosure of which is hereby incorporated herein by reference in its entirety.

FIELD OF INVENTION

This invention relates generally to wireless technology and more particularly to dynamic scheduling in new radio (NR) and new radio in the unlicensed spectrum (NR-U).

BACKGROUND OF THE INVENTION

Fifth generation mobile network (5G) is a wireless standard that aims to improve upon data transmission speed, reliability, availability, and more. This standard, while still developing, includes numerous details relating to various aspects of wireless communication, for example, NR and NR in the unlicensed spectrum (greater than 52.6 GHz), also known as NR-U.

SUMMARY OF THE DESCRIPTION

Aspects of the present disclosure relate to 5G new radio (NR) operating in the licensed band or in the unlicensed band (NR-U). 5G NR-U operates above the 52.6 GHz band.

In some aspects, a method or a device (e.g., user equipment or a baseband processor) configured to perform the method is described. The method can include receiving configuration information from a base station, wherein the configuration information comprises information for finding downlink control information (DCI); being polled by receiving the DCI that includes indication of a physical uplink control channel (PUCCH) resource for the UE to transmit a dynamic scheduling request (SR); finding the DCI based on the configuration information; and transmitting the dynamic SR in a PUCCH message based on the PUCCH resource, wherein uplink grant is performed based on the dynamic SR.

In some aspects, a method can include being polled by receiving a downlink control information (DCI) that includes a bit that instructs the UE whether or not to send a dynamic scheduling request (SR); and transmitting the dynamic SR in a PUCCH message based on a predetermined physical uplink control channel (PUCCH) resource configured in the UE, wherein uplink grant is performed based on the dynamic SR.

In some aspects, a method or network equipment (e.g., a base station or baseband processor) that is configured to perform the method is described. The method can include generating a downlink control information (DCI) message containing an indication of a physical uplink control channel (PUCCH) resource for a UE to use to transmit a dynamic scheduling request (SR); polling the UE by transmitting the DCI that includes the PUCCH resource which is dynamically updated based on one or more network conditions including network traffic, location of one or more UE, or which of the one or more UE have data to transmit; receiving the dynamic SR in a PUCCH message that is transmitted according to the PUCCH resource; and transmitting an uplink (UL) grant having beam and time scheduling determined based on the dynamic SR.

In some aspects, a method includes generating a downlink control information (DCI) that includes a bit that instructs a user equipment (UE) whether or not to send a dynamic scheduling request (SR); polling the UE by transmitting the DCI that includes the bit which is dynamically updated based on one or more network conditions including network traffic, location of one or more UE, or which of the one or more UE have data to transmit; receiving the dynamic SR in a physical uplink control channel (PUCCH) message; and transmitting an uplink (UL) grant having beam and time scheduling determined based on the dynamic SR.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILD DESCRIPTION

Figure 1:
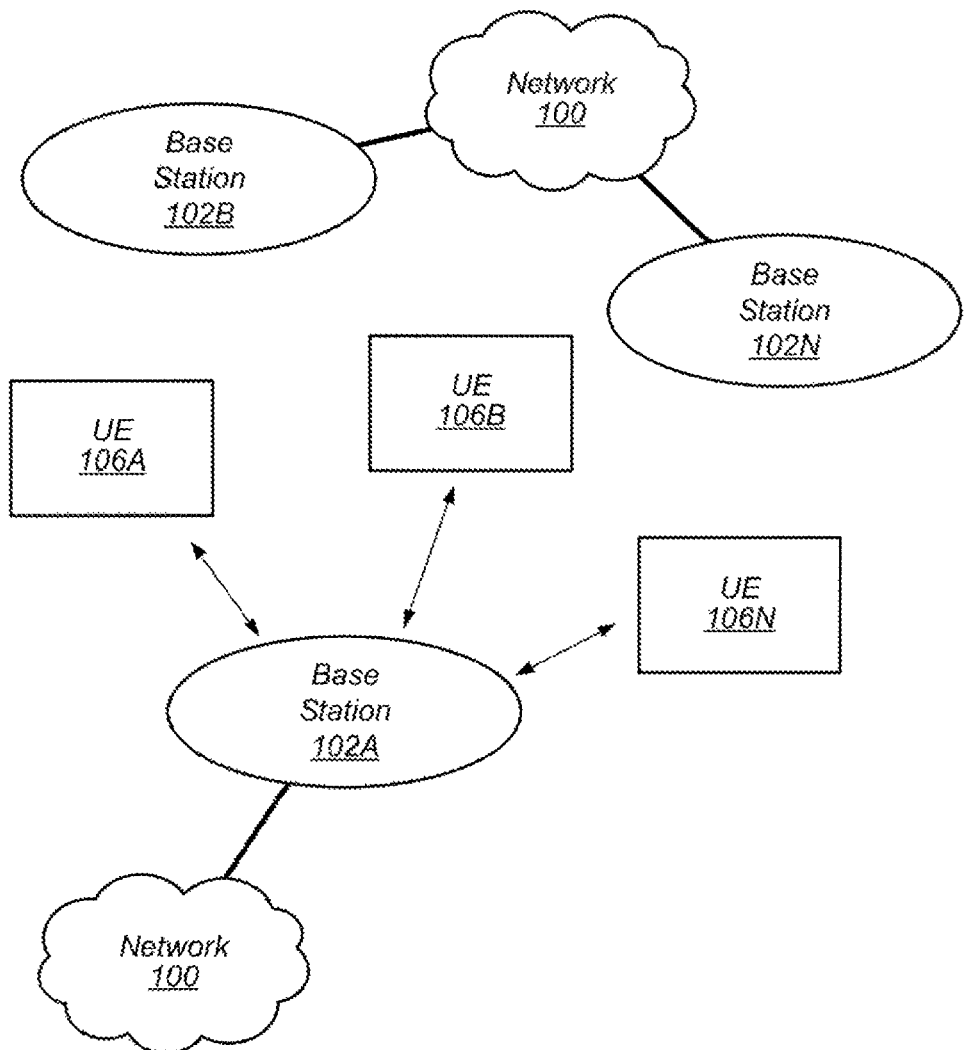
FIG. 1 illustrates an example wireless communication system according to some aspects.

A method and apparatus of a device that determines a physical downlink shared channel scheduling resource for a user equipment device and a base station is described. In the following description, numerous specific details are set forth to provide thorough explanation of aspects of the present invention. It will be apparent, however, to one skilled in the art, that aspects of the present invention may be practiced without these specific details. In other instances, well-known components, structures, and techniques have not been shown in detail in order not to obscure the understanding of this description.

Reference in the specification to "some aspects" or "an aspect" means that a particular feature, structure, or characteristic described in connection with the aspect can be included in at least one aspect of the invention. The appearances of the phrase "in some aspects" in various places in the specification do not necessarily all refer to the same aspect.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that determines a physical downlink shared channel scheduling resource for a user equipment device and a base station is described. In some aspects, the device is a user equipment device that has a wireless link with a base station. In some aspects, the wireless link is a fifth generation (5G) link. The device further groups and selects component carriers (CCs) from the wireless link and determines a virtual CC from the group of selected CCs. The device additionally can perform a physical downlink resource mapping based on an aggregate resource matching patterns of groups of CCs.

The frequency bands for 5G networks come in two sets—frequency range 1 (FR1) and frequency range 2 (FR2). FR1 covers communications from 450 MHz to 6 GHz, which includes the LTE frequency range. FR2 covers 24.25 GHz to 52.6 GHz. FR2 is known as the millimeter wave (mmWave) spectrum. In some aspects, the UE and base station can communicate over NR in the unlicensed band which is above FR2, also known as NR-U.

NR-U is a mode of operation that defines technology for cellular operators to integrate the unlicensed spectrum (e.g., frequencies greater than 52.6 GHz, such as, for example, between 52.6 GHz and 71 GHz) into 5G networks. Radio waves in this band have wavelengths in the so-called millimeter band, and radiation in this band is known as millimeter waves. NR-U enables both uplink and downlink operation in unlicensed bands. NR-U supports new features, for example, wideband carriers, flexible numerologies, dynamic TDD, beamforming, and dynamic scheduling/HARQ timing.

In NR-U, license-assisted use as well as standalone use are supported in the unlicensed spectrum. Operators can use a non-standalone mode to aggregate the unlicensed bands with licensed 5G frequencies to bolster capacity (e.g., similar to LAA), as well as a standalone mode wherein an enterprise could use unlicensed spectrum to deploy a private cellular network. It should be understood that aspects described in the present disclosure with reference to NR can also apply to NR-U and vice versa unless context dictates otherwise. Although NR-U has developed, problems exist regarding dynamic scheduling, as are discussed in other sections.

FIG. 1 illustrates a simplified example wireless communication system, according to some aspects. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1xRTT, 1xEV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some aspects, base station 102A may be a next generation base station, e.g., a 5G New Radio (5G NR) base station, or "gNB". In some aspects, a gNB may be connected to a legacy evolved packet core (EPC) network and/or to a NR core (NRC) network. In addition, a gNB cell may include one or more transition and reception points (TRPs).

In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
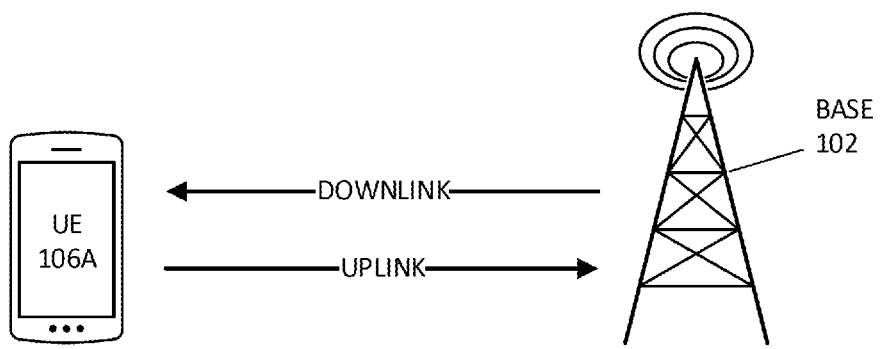
FIG. 2 illustrates uplink and downlink communications according to some aspects.

FIG. 2 illustrates UE 106A that can be in communication with a base station 102 through uplink and downlink communications, according to some aspects. The UEs may each be a device with cellular communication capability such as a mobile phone, a hand-held device, a computer or a tablet, or virtually any type of wireless device.

The UE may include a processor that is configured to execute program instructions stored in memory. The UE may perform any of the method aspects described herein by executing such stored instructions. Alternatively, or in addition, the UE may include a programmable hardware element such as an FPGA (field-programmable gate array) that is configured to perform any of the method aspects described herein, or any portion of any of the method aspects described herein.

The UE may include one or more antennas for communicating using one or more wireless communication protocols or technologies. In some aspects, the UE may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some aspects, the UE may include separate transmit and/or receive chains (e.g., including separate antennas and other radio components) for each wireless communication protocol with which it is configured to communicate. As a further possibility, the UE may include one or more radios which are shared between multiple wireless communication protocols, and one or more radios which are used exclusively by a single wireless communication protocol. For example, the UE might include a shared radio for communicating using either of LTE or 5G NR (or LTE or 1×RTT or LTE or GSM), and separate radios for communicating using each of Wi-Fi and Bluetooth. Other configurations are also possible.

Figure 3:
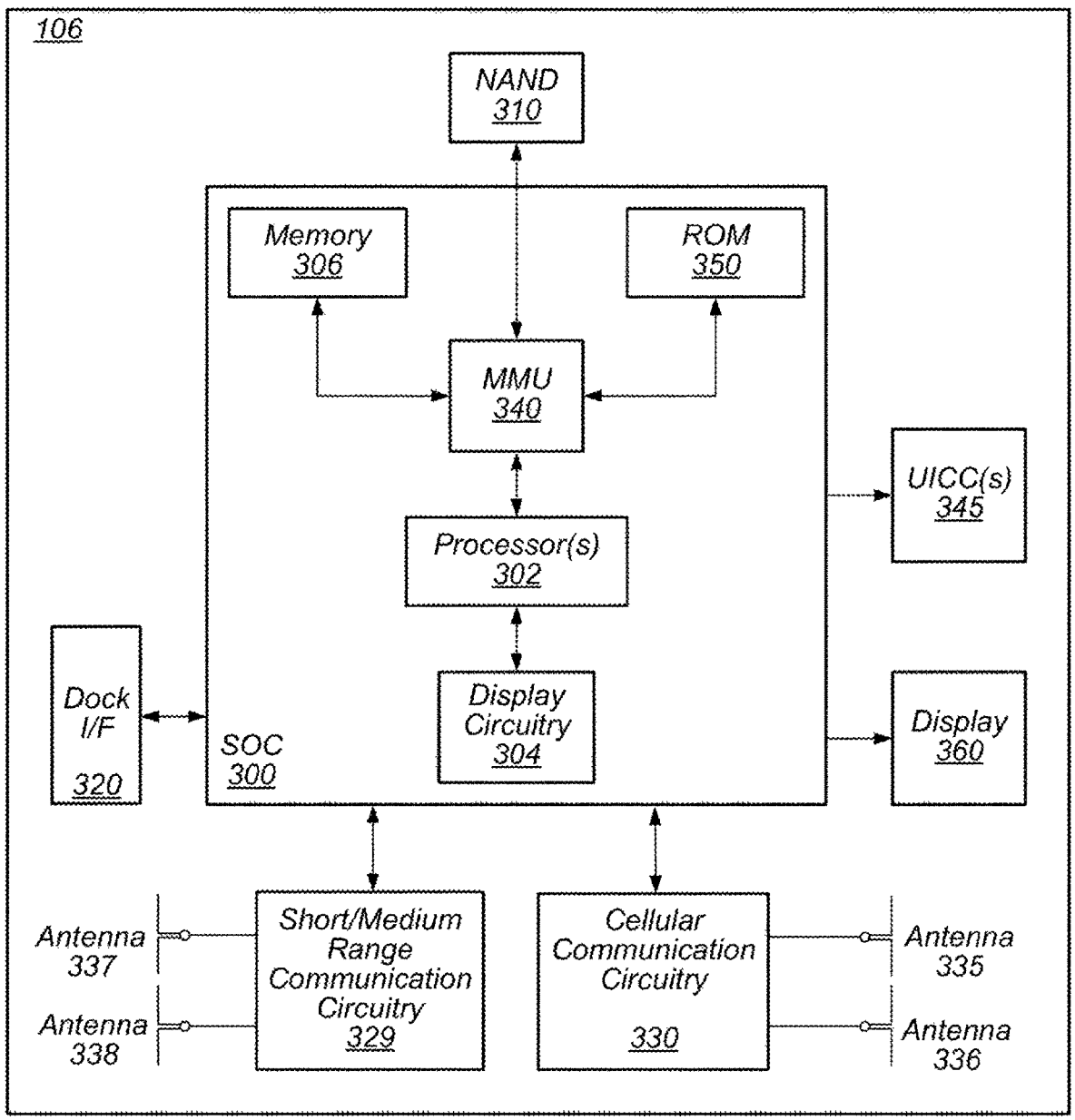
FIG. 3 illustrates an example block diagram of a UE according to some aspects.

FIG. 3 illustrates an example simplified block diagram of a communication device 106, according to some aspects. It is noted that the block diagram of the communication device of FIG. 3 is only one example of a possible communication device. According to aspects, communication device 106 may be a UE device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some aspects, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some aspects, as further described below, cellular communication circuitry 330 may include dedicated receive chains (including and/or coupled to, e.g., communicatively; directly or indirectly. dedicated processors and/or radios) for multiple radio access technologies (RATs) (e.g., a first receive chain for LTE and a second receive chain for 5G NR). In addition, in some aspects, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some aspects, the MMU 340 may be included as a portion of the processor(s) 302.

As noted above, the communication device 106 may be configured to communicate using wireless and/or wired communication circuitry. The communication device 106 may also be configured to determine a physical downlink shared channel scheduling resource for a user equipment device and a base station. Further, the communication device 106 may be configured to group and select CCs from the wireless link and determine a virtual CC from the group of selected CCs. The wireless device may also be configured to perform a physical downlink resource mapping based on an aggregate resource matching patterns of groups of CCs.

As described herein, the communication device 106 may include hardware and software components for implementing the above features for determining a physical downlink shared channel scheduling resource for a communications device 106 and a base station. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
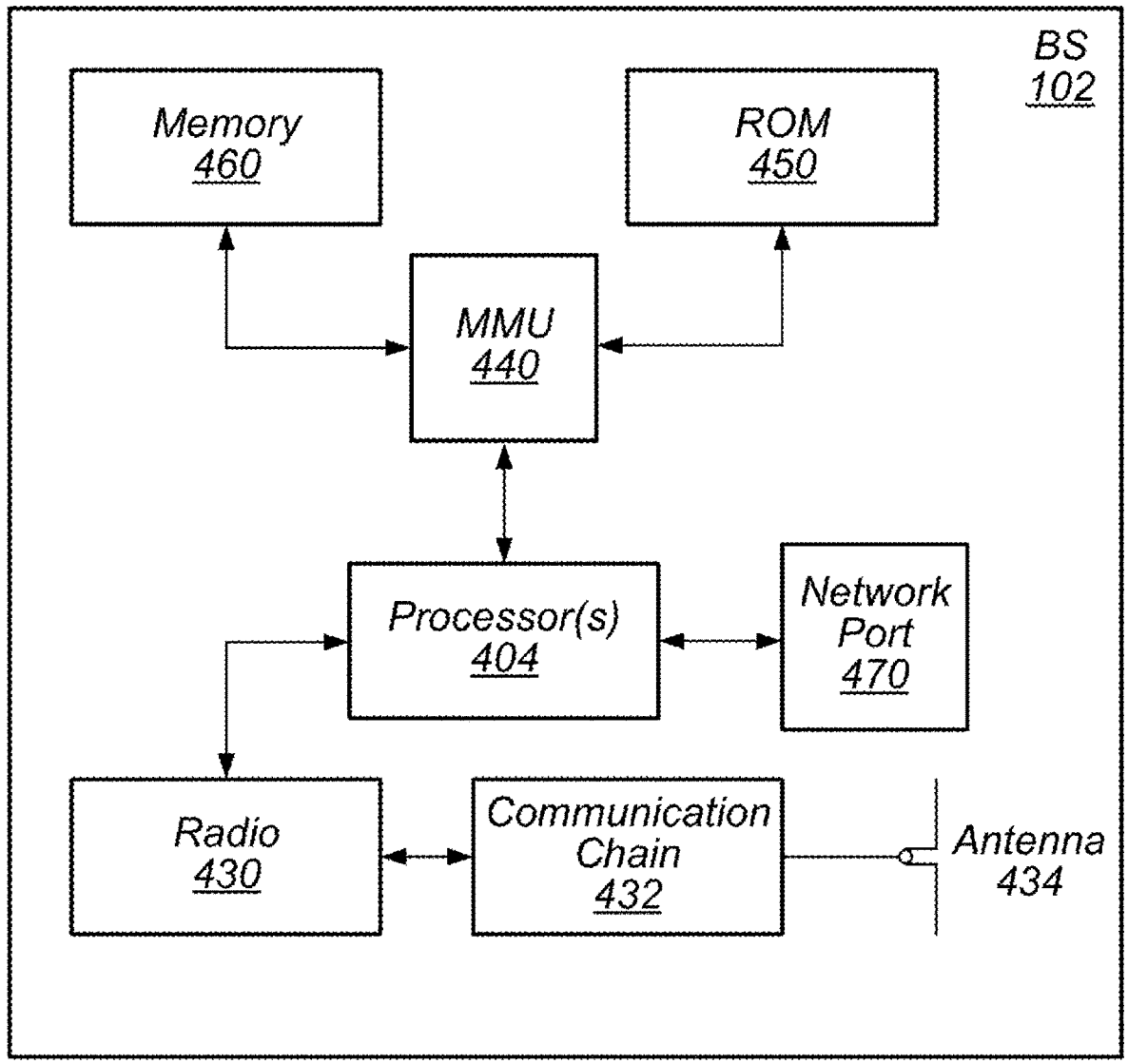
FIG. 4 illustrates an example block diagram of a BS according to some aspects.

FIG. 4 illustrates an example block diagram of a base station 102, according to some aspects. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some aspects, base station 102 may be a next generation base station, e.g., a 5G New Radio (5G NR) base station, or "gNB". In such aspects, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs. In some aspects, the base station can operate in 5G NR-U mode.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, 5G NR-U, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR and 5G NR-U. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
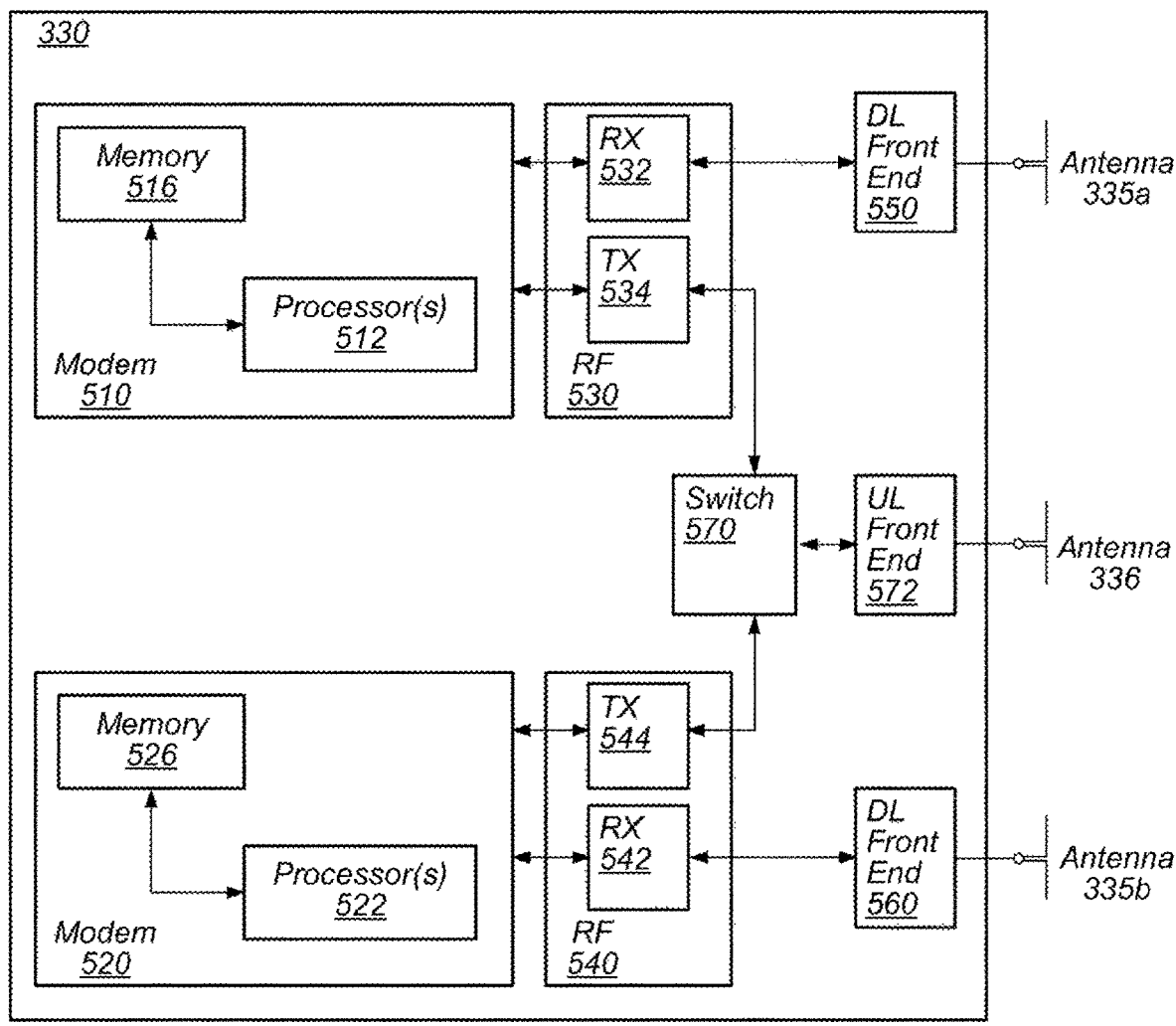
FIG. 5 illustrates an example block diagram of cellular communication circuitry, according to some aspects.

FIG. 5 illustrates an example simplified block diagram of cellular communication circuitry, according to some aspects. It is noted that the block diagram of the cellular communication circuitry of FIG. 5 is only one example of a possible cellular communication circuit. According to aspects, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some aspects, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some aspects, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some aspects, receive circuitry 542 may be in communication with DL front end 560, which may include circuitry for receiving radio signals via antenna 335b.

In some aspects, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

As described herein, the modem 510 may include hardware and software components for implementing the above features or for determining a physical downlink shared channel scheduling resource for a user equipment device and a base station, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for determining a physical downlink shared channel scheduling resource for a user equipment device and a base station, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

NR-U listen before talk (LBT) channel access mechanism can be based on ED-based LBT of license assisted access (LAA). Two types of LBTs channel access mechanisms include a frame based equipment (FBE) access load based equipment (LBE) access. For FBE, a transmit/receive structure has a periodic timing with a periodicity equal to the fixed frame period. For LBE, a transmit/receive structure is not fixed in time but demand-driven. There are four categories of LBT that are defined in LAA LBE operations which can be used as a baseline for NR-U. Category 1 is no LBT (i.e. immediate transmission). Category 2 is LBT without random backoff. Category 3 is LBT with random backoff with fixed size contention window. Category 4 is LBT with random backoff with variable size contention window.

After a successful LBT, an initiating device can access a channel at most for a duration of a maximum channel occupancy time (MCOT). Sharing of channel occupancy time (COT) can be performed between an initiating and responding node in any direction, such as, for example, gNB-acquired COT sharing and UE-acquired COT sharing. Two MCOT structures include LAA and NR-U. LAA has a single DL to UL switch. This provides for less overhead due to one single GP, and avoids multiple LBT. One setback here is that larger latency may be present for HARQ-ACK feedback.

NR-U also supports multiple DL to UL switch and UL to DL switch. This can result in reduced latency for delay-sensitive traffic, e.g. URLLC. In NR-U, if the gap between DL and UL or UL and DL is within 16 us (same as SIFS in Wi-Fi), the transmission after the gap can occur without channel sensing i.e. Cat-1 LBT. If the gap is larger than 16 us but less than 25 us, Cat-2 is allowed.

For initiation of a COT by the gNB (operating as a LBE device), the channel access schemes in the table below can be used.

TABLE 1

| Channel access schemes for gNB as LBE device | | |
|---|---|---|
| Condition | CAT 2 LBT | CAT 4 LBT |
| DRS alone or multiplexed with non-unicast data (e.g. OSI, paging, RAR) | When the DRS duty cycle ≤1/20, and the total duration is up to 1 ms: 25 μs Cat 2 LBT is used (as in LAA) | When DRS duty cycle is >1/20, or total duration >1 ms, Cat 4 with any channel access priority class value can be used |
| DRS multiplexed with unicast data | N/A | Channel access priority class is selected according to the multiplexed data |
| Physical downlink control channel (PDCCH) and/or Physical downlink shared channel (PDSCH) | N/A | Channel access priority class is selected according to the multiplexed data |

At least for the case where a DL burst follows a UL burst within a gNB-initiated COT and there is no gap larger than 25 μs between any two transmissions in the COT, the channel access schemes in the table below apply.

TABLE 2

| Channel access schemes for a DL burst follows a UL burst within a gNB-initiated COT as LBE device | |
|---|---|
| Cat 1 Immediate transmission | Cat 2 LBT |
| When the gap from the end of the scheduled UL transmission to the beginning of the DL burst is up to 16 μsec | When the gap from the end of the scheduled UL transmission to the beginning of the DL burst is larger than 16 μsec but not more than 25 μsec |

A DL/UL burst is defined as a set of transmissions from a given gNB/UE having no gaps or gaps of no more than 16 us. Transmissions from gNB/UE having a gap of more than 16 us are considered as separate DL/UL bursts.

Within a gNB-initiated COT, an UL burst for a UE consisting of one or more of physical uplink shared channel (PUSCH), physical uplink control channel (PUCCH), physical random access channel (PRACH), and sounding reference signal (SRS) follows the channel access schemes in the table below.

TABLE 3

Channel access schemes for a UL burst within a gNB-initiated

| Cat 1 Immediate transmission | Cat 2 LBT | Cat 4 LBT |
|---|---|---|
| When the gap from the end of the DL transmission to the beginning of the UL burst is not more than 16 msec. | For any of the following cases:<br>a) When the gap between any two successive scheduled/granted transmissions in the COT is not greater than 25 msec<br>b) For the case where a UL transmission in the gNB initiated COT is not followed by a DL transmission in the same COT<br>Note: the duration from the start of the first transmission within the channel occupancy until the end of the last transmission in the same channel occupancy shall not exceed 20 ms. | N/A |

For initiation of a COT by the UE, the channel access schemes in the below table can be used—using Cat-4 LBT for UCI-only PUSCH.

TABLE 4

Channel access schemes for initiating a COT by UE

| | Cat 2 LBT | Cat 4 LBT |
|---|---|---|
| PUSCH (including at least UL-SCH with user plane data) | N/A except for the cases discussed in Note 2 below | Channel access priority class is selected according to the data |
| SRS-only | N/A | Cat4 with lowest channel access priority class value (as in LTE eLAA) |
| RACH-only | N/A | Cat4 with lowest channel access priority class value |
| PUCCH-only | (see Note 2) | Cat4 with lowest channel access priority class value |

Three different channel access mechanisms for Hybrid MAC for 60 GHz includes CSMA/CA, TDMA, and polling. CSMA/CA is suitable for bursty traffic. Ideally CSMA/CA needs omni-directional transmit and receive beams. In directional CSMA/CA, gNB is omni, and UE is directional. In paired CSMA/CA, UE switches beams for listen vs talk. For example, listen is omni, or in opposite direction). For 802.11ad. during the Contention Based Access Period, enhanced 802.11 EDCA includes traffic categories to support quality of service, frame aggregation and block acknowledgments.

TDMA is suitable for large file transfer or wireless display, and/or when a UE is in non-interference region. Regarding 802.11ad with TDMA, service periods can be dedicated to a pair of communicating nodes. HCF is extended.

Polling can be performed in contention based period and service period. During polling, an AP pings each UE for data (directional SR), UE replies (directional PUCCH), gNB schedules UE and UE transmits. Regarding 802.11ad and polling, Dynamic Channel Time Allocation is used. PCP/AP acquires medium, PCP/AP sends polling frames, STas send Service Period Requests (SPRs), PCP/AP allocates time with grant frames.

Hybrid MAC can be a mix of all three channel access mechanisms. Hybrid MAC is used in 802.11ad.

Regarding channel access frame structure, a beacon interval can include a beacon header interval (BHI) and data transmission interval (DTI). The BHI facilitates the exchange of management information and network announcements using a sweep of multiple directionally transmitted frame. In a BTI, a sector level sweep can be performed with multiple beacon frames (MCSO). In an Association Beamforming Training (A-BFT) timeslot, a responder sector level sweep (MCSO) can be performed. In an Announcement Transmission Interval (ATI), a PCP/AP exchanges management information with an associated and beamtrained station (MCSx).

A DTI implements different types of medium access. Schedule can be announced by PCP/AP. During the DTI, multiple contention based access periods (CBAP) can be performed using a variation of enhanced distributed coordination function (EDCF). In some cases, rather than CBAP, multiple service periods (SP): communication between a dedicated pair of nodes in a contention free period. Dynamic channel allocation can be supported through polling of STAs within CBAP or SP by PCP/AP and dynamic allocation of resources. In dynamic channel allocation, a schedule can be communicated by extended schedule element. In this case, pseudo-static access is used, the dynamic schedule recurs at the same relative offset to target beacon transmission time (TBTT) and within the same duration.

Scheduled/pseudo-static Contention Based Access can also be performed, such as CSMA/CA, for dynamic channel access. The schedule can be sent in a CBAP. The schedule can include traffic categories to support quality of service, frame aggregation and block ACKs. This access method supports multiple NAV timers (one per peer STA), e.g., a transmission can be initiated with device if NAV for device is 0.

Scheduled/pseudo-static TMDA channel time allocation (TDMA) can be performed. A schedule can be broadcast by PCP/AP in schedule element next to BTI or ATI. The schedule is sent in the Service Period (SP). This access method allows D2D transmission and supports multiple NAV timers (one per peer STA) for protected mode transmission.

Dynamic channel time allocation (polling) can be performed. In such a case, STA can poll to receive SPR (Service Period Request). Time is allocated based on request using grant frames. This access method can be used in both CBAP (PCP/AP uses PIFS) and SP.

For periods of time that are scheduled by the AP/PCP, where any STA can access the channel, access during the CBAP is based on EDCA. All CBAPs are allocated by AP or PCP, except when allocated by a non-AP and non-PCP STA with the transmission of a grant frame following an SP truncation. There may be multiple CBAPs present in a beacon interval. PCP/AP may initiate a frame transmission within the CBAP immediately after the medium is determined to be idle for one PIFS (8 usecs). Operation of EDCAF is suspend at the end of a CBAP and resumed at beginning of following CBAP. The frame sent by the STA at the beginning of the TXOP may be an RTS frame or a DMG CTS-to-self frame.

Within a CBAP a STA with multiple DMG antennas should use only one DMG antenna in its frame transmission, CCA and frame reception, except if it is the initiator or responder in an SLS (10.42 (DMG beamforming)). In such a case, the algorithm to select a DMG antenna and switch the active DMG antenna is implementation dependent. Within CBAPs a STA that changed to a different DMG antenna in order to transmit should perform CCA on that DMG antenna until a frame is detected by which it can set its NAV, or until a period of time equal to the dot11DMGNavSync has transpired, whichever is earlier.

A service period can be negotiated between AP/PCP and STA or dynamically allocated, where only prescribed STAs can access the channel. The service period can be broadcast to multiple STAs, used for D2D transmission, dynamically extended beyond the allocated time in the current SP in specific scenarios, and/or dynamically truncated to release the remaining time in the SP (if truncatable)

Regarding service period recovery procedure; when a non-AP and non-PCP STA fails to receive the extended schedule element for a beacon interval, the non-AP and non-PCP STA has no knowledge of the non-pseudo-static SPs allocated during the beacon interval that indicate it is the source DMG STA; therefore, it fails to transmit during those SPs. If the destination of the non-pseudo-static SP is an AP or PCP and it does not receive any frames from the source on-AP and non-PCP STA for a timeout interval, the AP/PCP may truncate the SP and reallocate the remaining duration of the SP to the source DMG STA of the SP or other STAs provided it is a truncatable SP. If not truncatable, it may stay awake or go into doze state. If non-AP/non-PCP STA does not receive an extended schedule element from the AP or PCP for that beacon interval, it may switch to doze state or may direct its receive antenna toward the AP or PCP to receive a grant during non-pseudo-static SPs or CBAPs in the current beacon interval.

A protected period can be enforced to minimize interference between pairs of communicating STAs. This protected period can be enforced by limiting the transmission of frames during the DMG protected period to not more than one pair of potentially interfering pairs of communicating stations. Dynamic BW operation to can be used to negotiate BW to be used by this SP. STA can be set to listening mode for an interval before SP and only transmit if clear (CAT2 type access). In this case, antennas are in Quasi-omni mode or directed towards peer DMG STA. The protected period can be established through a RTS/DMG CTS handshake. Interference can be reported to PCP/AP.

Dynamic allocation of a service period can be employed to allocate channel time during scheduled SPs and CBAPs. The dynamic allocation can include an optional polling period (PP) phase and a grant period (GP) phase.

Regarding channel access intervals, before BI, CAT 4 applies. Within BTI and A-BFT, fixed intervals apply. In such a case, the MBIFS shall be used between the BTI and the A-BFT and between the ISS, RSS, SSW-Feedback, and SSW-Ack. MBIFS is equal to 3×aSIFSTime. A-BFT can be slotted with MBIFS between packets in a slot. Between A-BFT and ATI the larger of (guard time, MBIFS) applies. Within ATI, once the ATI starts, the AP or PCP may start transmission of a request frame immediately or it may delay the transmission of the request frame if the medium is determined by the CCA mechanism to be busy. Response is SIFS from request frame. Source initiates at start of SP except if protected period needs to be established i.e. listens to medium based on RTS/DMG CTS transmission. A reply (SIFS) and/or retransmit (PIFS) can be performed in SP. In CBAP, CAT4 applies. For PCP/AP or other sources, PIFS applies. For polling SBIFS and/or SIFS is used.

For communications (e.g., 5G-NRU) that operate at >52.6 GHz, it may be desirable for a gNB to perform a dynamic polling of all the UEs to identify which UEs have data and modify its resource allocation accordingly. This allows flexible reassignment of time and beam resources in mmWave transmission.

Satisfactory communications could require beams in direction of UE. Due to beam based allocation, a UE may only be able to send an SR dynamically only when its beam pair is active. If dynamic change in beam pair, UE may not know if beam is active to send SR and request for resources. Statically allocate resources, in this case, may be deficient. Thus, communications can benefit from a dynamic SR in an NR or NR-U environment.

A SR that uses a PRI in the DCI to indicate a set of semi-statically configured PUCCH resources identified by a first symbol, a number of symbols and other parameters may lack flexibility. Additional flexibility may be needed to indicate the PUCCH resource(s) relative to the DCI and appropriate signaling within the DCI. Thus, a dynamic SR configuration may provide improved flexibility.

Overhead of signaling the presence of an SRI in a DCI can be high if PUCCH resources are dynamically changed and DCI is used to signal the PUCCH resource. To reduce overhead, in some aspects, PUCCH resource signaling for Dynamic SR can be part of an existing DCI transmission. In some aspects, dedicated PUCCH resource signaling for Dynamic SR. In some aspects, a semi-static configuration can reduce overhead.

Based on LBT failure, a methodology could be required to enable reliable PUCCH and PUSCH transmission. For example, multiple PUCCH resources can be signaled. To communicate over PUSCH, additional information may also be needed in the SR feedback to enable the gNB identify the best resource to send information in e.g. beam, CC, or BWP. Multiple resources can be signaled for PUSCH transmission.

In some aspects, with signaling of dynamic resources, there may be timeline issues. Time gaps may be enforced between signaling. The gap can be determined based on the number of beams and/or processing time.

Figure 6:
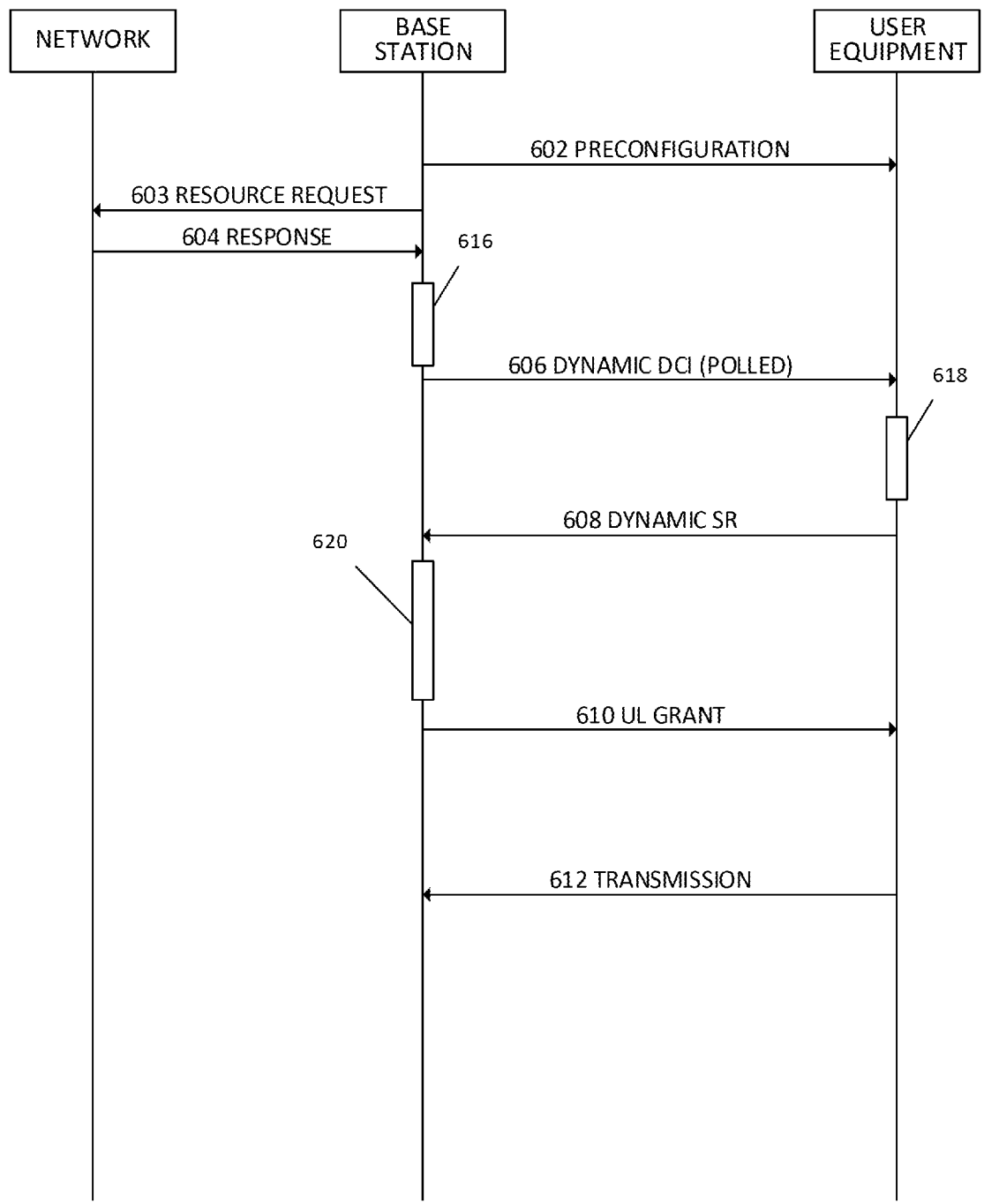
FIG. 6 illustrates an example sequence for performing dynamic scheduling in NR or NR-U, according to some aspects.

Referring to FIG. 6, dynamic scheduling is shown according to some aspects. The dynamic scheduling can be performed over 5G NR or 5G NR-U.

At operation 602, the base station can transmit configuration information to a user equipment (UE) that indicates how to find a DCI. The configuration information describes where the DCI is located (e.g., a location within a COT allocated to the base station).

In some aspects, the configuration information defines a search space (SS) that the UE can use to locate the DCI (e.g., within a COT). The search space can be an area (e.g., defined as a block of time or data) in a downlink resource defined for a UE to perform blind decoding to try to find data (e.g., a DCI).

In some aspects, the search space is defined as fixed relative to a start of the COT. For example, the search space can be defined as being 'x' number of resource blocks that begins 'y' symbols after the beginning of a COT. In some aspects, the search space can be defined as part of downlink burst signaling. For example, the search space can be defined as a group common physical downlink control channel (GC-PDCCH) COT in time/frequency domain structure.

In some aspects, rather than define a search space, the configuration information can specify a precise location of the DCI. The receiving UE is configured with the exact location of the DCI in a received transmission to decode the DCI accordingly. In some aspects, configuration information can define the DCI as positioned relative to numerology. For example, the DCI can be defined as having a location relative to specific resource blocks and symbols. A symbol can be an OFDM symbol describing a time slot in a frequency band for a particular channel. Numerology refers to the configuration of waveform parameters. Different numerologies can be considered as OFDM-based subframes having different parameters such as subcarrier spacing/symbol time, CP size, etc.

In some aspects, the configuration information defines the DCI message as positioned relative to a start of the COT. For example, the DCI message can be defined in the configuration information as being 'x' number of resource blocks 'y' symbols fixed relative to the beginning of the COT. In some aspects, configuration information defines the DCI as being part of downlink burst signaling. For example, the DCI location can be defined in the configuration information as being located in a group common physical downlink control channel (GC-PDCCH) COT in time/frequency domain structure.

The UE can receive the configuration information from the base station, that includes details as to how to find the DCI message (e.g., in a COT).

At operation 603, a base station can request network resources, such as a channel occupancy time (COT) or maximum channel occupancy time (MCOT) of a channel, from a network. The network can determine the COT or MCOT to be allocated for the base station, and at operation 604 send a response to the base station that includes COT or MCOT. In some aspects, the resource request 603 is performed through a contention-based protocol (e.g., LBT). In some aspects, the network resources are statically configured, e.g., the base station has a statically assigned channel and time. The network can include a mix of network devices that share bandwidth over common frequencies.

At operation 604, the network can send a response to the base station that allocates channel resources. For example, the response can define a COT or MCOT with which the base station is free to use a channel. It should be understood that operation 602 can occur before and/or after operations 603 and 604.

At operation 616, the base station can generate a DCI. The DCI can indicate to each of the one or more UEs what PUCCH resources should be used by a UE to send a dynamic SR. The PUCCH resource can include a symbol (e.g., 10, 16, 18), that defines to the UE and base station which beam pair and/or time the dynamic SR will be communicated over. The PUCCH resources can be dynamically updated based on one or more network conditions including network traffic, location of one or more UE, or which of the one or more UE have data to transmit. Details of the PUCCH resource are discussed in other sections. The DCI can have a format 2_0, 2_1, 2_2, or other downlink DCI format currently existing or developed in the future.

At operation 606, the base station can poll the UE by transmitting a DCI can be to one or more UEs (such as the one shown in FIG. 6). The PUCCH resources that are associated with each of the one or more UEs, which are indicated in the DCI, can change over time based on network conditions. The DCI transmissions can be performed periodically, or whenever a change to the network conditions occurs which can prompt a change to the allocation of PUCCH resources to the one or more UEs.

At operation 618, the UE can receive/decode the DCI, and find the DCI based on the configuration information received at operation 602, as described in other sections. The UE can decode the DCI to determine the PUCCH resource to be used to send the dynamic SR.

The PUCCH resource can be signaled to the UE in different ways. In some aspects, the DCI includes a PUCCH resource indicator (PRI) having a bit field that indicates the PUCCH resource to be used for the dynamic SR. The PUCCH resource can be a 3-bit indicator that is included as part of the DCI, which can have format 1_0 or 1_1. PUCCH resources for HARQ are typically signaled as part of DCI format 1_1 in the PRI (which can be 3 bits). A new field may be added, or an additional bit may be added (e.g., to form a 4 bit PRI) to indicate whether the PRI is associated with hybrid automatic repeat request (HARQ) or dynamic SR. In some aspects, rather than having separate PUCCH resources for HARQ and dynamic SR, the dynamic SR can be multiplexed with a HARQ transmission.

Understanding that PUCCH resources may be needed for both HARQ and SR, and that PUCCH resources may be semi-statically configured to identify an absolute first symbol location, a number of symbols and other parameters, there are some options below that can use new table (different from the semi-statically configured look-up) or a subset of the semi-statically configured look-up.

In some aspects, the UE finds the PUCCH resource based on a) a resource lookup different from a semi-static PUCCH lookup, and b) a relative first symbol location that is relative to a position of the PRI in the DCI. For example, if the PRI is received in symbol n and indicates a relative first symbol location x, the PUCCH resource can be in or start from the symbol (n+x).

In some aspects, the UE finds the PUCCH resource based on a) a subset of a semi-static PUCCH lookup, and b) a relative first symbol location that is relative to a position of the PRI in the DCI. For example, if the PRI is received in symbol n and indicates a relative first symbol location x, the PUCCH resource can be in or start from the symbol (n+x). The subset may be the first m entries of the table or a configured sub-set of m entries of the table.

In some aspects, the dynamic SR includes or is multiplexed with channel state information (CSI). CSI is a mechanism that allows the UE to report measured radio channel quality to the base station.

In some aspects, the PUCCH resource signaling is performed by assigning a CRC or a scrambled CRC to a UE. The CRC or scrambled CRC can be assigned to one or more UEs. For example, the CRC can be scrambled with demodulation reference signal (DRS) radio network temporary identifier (RNTI) and the RNTI can be assigned to the UE. The CRC or scrambled CRC can indicate to the UE which bit-field in a DCI carries a PUCCH resource indicator for that UE. A single DCI can carry multiple UE-dedicated bit fields, each of which carry PUCCH resource for dynamic SR transmission for the corresponding UE.

Figure 7:
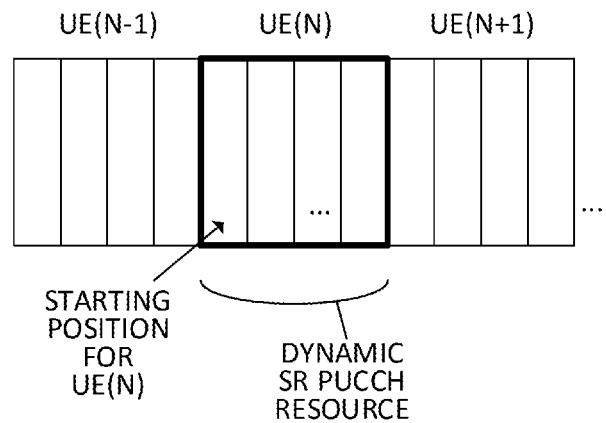
FIG. 7 illustrates an example of dynamic scheduling resource signaling, according to some aspects.

For example, referring to FIG. 7, the UE (e.g., UE(N)) is one of a plurality of UEs, and the DCI includes a plurality of bit fields, each bit field being assigned to a corresponding one of the one or more UE. The PUCCH resource (e.g., one or more symbols) for the UE to use for transmitting the dynamic SR is indicated in the bit field assigned to the UE.

In some aspects, each bit field can be assigned to the corresponding one of the one or more UE based on a radio network temporary identifier (RNTI). For example, a check record sum of the entire DCI or each bit field is scrambled with RNTI, and each RNTI is assigned to each of the one or more UE.

Each RNTI can be used by the UE to find the bit field that is assigned to a UE. A starting position and number of bits (e.g., if the size is variable) of each of the plurality of bit fields can be semi-statically configured. In some aspects, the starting position alone is enough (e.g., if the size bit field is not variable). The PUCCH resource for the UE is indicated in one of the plurality of bit fields (e.g., as a value), and PUCCH resources for others of the plurality of UEs are located in others of the plurality of bit fields. In some aspects, a bit field dedicated to a single UE can signal more than one PUCCH resource in case there may be an LBT failure of the single resource. In some aspects, the DCI has a format of 2_6 or a group common DCI.

Upon successful decoding of the PUCCH resource (e.g., the PUCCH resource is found by the UE), the UE may send a dynamic SR in the specified PUCCH resource. If decoding of the PUCCH resource is unsuccessful (e.g., the UE cannot find the PUCCH resource), then the UE can decline to send the dynamic SR.

Referring back to FIG. 6, at operation 608, the UE can transmit the dynamic SR in a PUCCH message based on the PUCCH resource that was indicated in the DCI. For example, the PUCCH resource can include a symbol (e.g. 10, 16, 18), that defines to the UE and gNB which beam pair and/or time the dynamic SR will be communicated over. The SR is communicated over a PUCCH message as defined by the symbol (e.g., at a particular time using a particular beam pair). Symbol format and PUCCH format can vary based on application.

In some aspects, the dynamic SR that is transmitted from the UE to the base station can include PUCCH signaling for increased reliability. This can be used to assist the base station in determining resources for data transfer.

Figure 8:
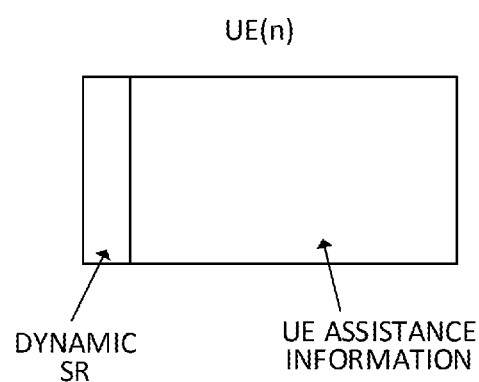
FIG. 8 shows an example of a scheduling request that includes UE assistance information, according to some aspects.

For example, as shown in FIG. 8, the UE may include, in the dynamic SR, additional information (e.g., UE assistance for LBT) to enable the gNB to identify an improved resource to send information in the scheduling phase. This can include, for example, a beam, a listen before talk (LBT) band, a time slot to transmit, and bandwidth parts (BWPs). In some aspects, the UE sends the dynamic SR only if the UE wishes to reserve a slot and/or has data to send to the base station and/or has successfully found and decoded the PUCCH resource.

At operation 620, the base station can process the SR to determine which resources the uplink transmission will use. In other words, the base station determines which PUSCH resource that the UE will use for the UL transmission of data. This determination can be based on network traffic, SR requests from other UEs (that can be used to schedule traffic to and from multiple UEs), and information (e.g., UE assistance for LBT) that was sent back from the UE in the dynamic SR request at operation 608.

At oration 610, the base station can send an UL grant to the user equipment, which can be a scheduling DCI (e.g., format 0_X). At operation 612, the UE can transmit UL data to the base station, over UL resources that are specified in the UL grant.

In some aspects, the DCI resource and the corresponding dynamic SR resource (e.g., the PUCCH resource) may be semi-statically configured together. In this case, a single bit (or a field of bits where each bit corresponds to a particular UE) may be configured to indicate if the UE should send a dynamic SR in a predetermined resource. The bit or field of bits can be transmitted by the base station to one or more UEs, and dynamically updated (e.g., from one time to another, and/or between periodic transmissions of the DCI) based on one or more network conditions including network traffic, location of one or more UE, or which of the one or more UE have data to transmit or changes thereof.

Figure 9:
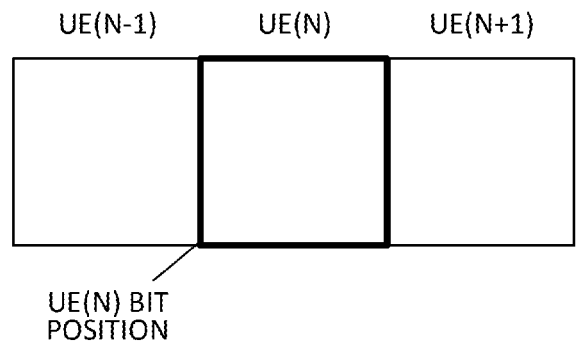
FIG. 9 shows an example of a bit field used for dynamic scheduling request with semi-statically configured resources, according to some aspects.

For example, referring to FIG. 9 a bit field 900 is shown, which can be included in the DCI (or other suitable downlink communication), can indicate to one or more UEs whether or not each of the one or more UEs should transmit a dynamic SR. In this case, rather than including the PUCCH resource in the DCI, the PUCCH resource is semi-statically configured. In some aspects, the bit field need not be carried in DCI, but can be carried in another suitable downlink communication from the base station the UE. In other words, where the dynamic SR resources are semi-statically configured, operation 602 of FIG. 6 can be bypassed, and operation 606 need not include a polled DCI, but can be any suitable downlink communication carrying the described bit-field. The UE need not find the PUCCH resource because the UE will 'know' which PUCCH resource to use for the dynamic SR based on the semi-static configuration. For example, the base station can configure the UE to use symbol 10. So long as the bit corresponding to the UE is set in a received poll, the UE will send a dynamic SR using symbol 10.

It should be understood that semi-static configuration can be performed through radio resource control (RRC) communications between a base station and a UE (e.g., from a base station to the UE, and vice versa). RRC protocol can include connection establishment and release functions, broadcast of system information, radio bearer establishment, reconfiguration and release, RRC connection mobility procedures, paging notification and release and outer loop power control. By means of the signaling functions, the RRC configure a UE (e.g., semi-statically).

Figure 10:
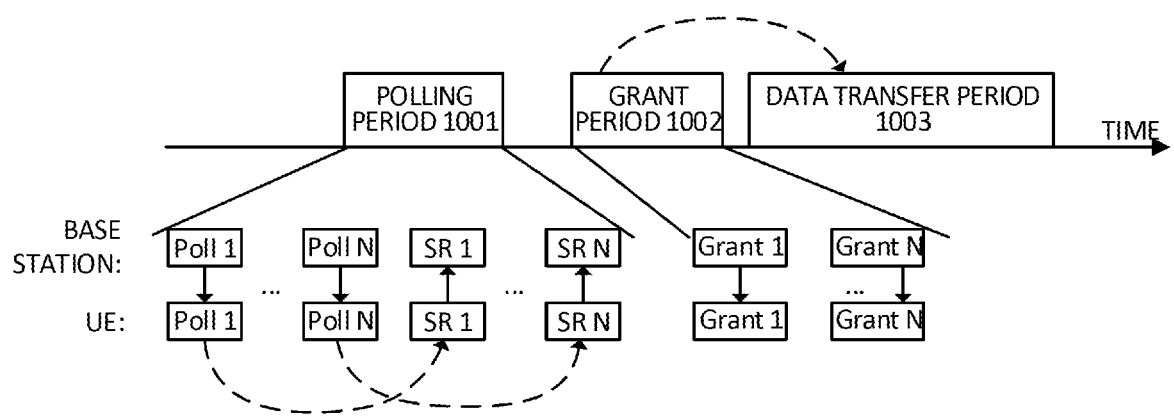
FIG. 10 shows an example of scheduling requests with multiple UEs, according to some aspects.

FIG. 10 shows an example of SR scheduling with multiple UEs. During polling period 1001, a base station can poll N number of UEs. Some or all of the UEs can respond with a corresponding SR. During a grant period 1002, the base station can transmit UL grants (e.g., in the form of a scheduling DCI) to the UEs. UL transmission can be performed during data transfer period 1003.

Figure 11:
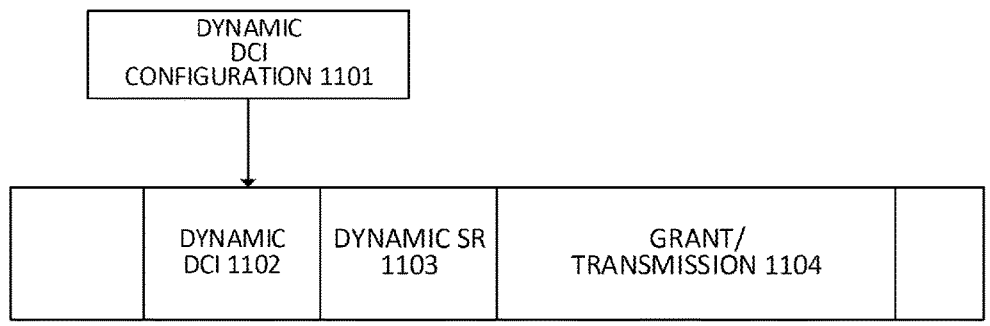
FIG. 11 shows an example of dynamic scheduling request, according to some aspects.

FIG. 11 shows a flow diagram of dynamic scheduling, according to some aspects. DCI configuration can be sent from the base station to the UE at block 1101. This tells the UE how to find the DCI or where to expect to find the DCI. The DCI is sent to the UE at block 1102. At block 1103, the dynamic SR is sent from the UE to the base station. At block 1104, a UL grant is sent from the base station to the UE and data is sent from the UE to the base station.

Figure 12:
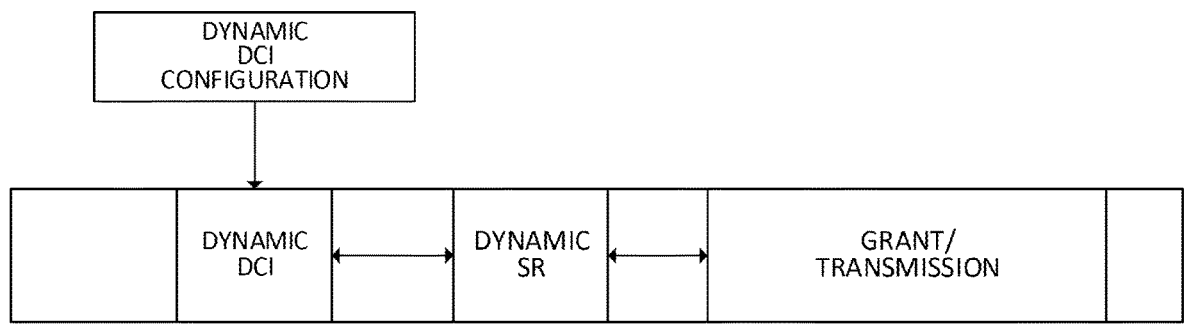
FIG. 12 shows dynamic scheduling with enforced time intervals between communications, according to some aspects.

Referring to FIG. 12 shows a flow diagram of dynamic scheduling similar to FIG. 11, however, in this case, due to beam switching and processing times, a minimum time interval can be enforced between the elements of the dynamic scheduling (e.g., the DCI, dynamic SR, scheduling DCI and/or transmission). Thus, a time interval can be enforced between some of the communications between the UE and the base station (e.g., between receiving the DCI and transmitting the dynamic SR, or between receiving the dynamic SR and transmitting the UL grant). The time interval can be greater than or equal to a larger of a) a time required to change from one beam to another (e.g., of the UE and/or the base station), or b) a processing time (e.g., of the UE).

The processing time either be fixed to a value based on 120 kHz, or modified to account for new sub carrier spacing (SCS) values (e.g., 240 kHz, 480 kHz, 960 kHz, etc.). The beam switching time may be based on existing beam switching time limits (e.g., of a UE). The gNB may schedule each element of the procedure in groups. This scheduling may be transparent to the UE. In some aspects, for 120 kHz, tproc2=20 symbols. As such, the interval between DCI and dynamic SR should be at least 20 symbols.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

A baseband processor (also known as baseband radio processor, BP, or BBP) is a device (a chip or part of a chip) in a network interface that manages radio functions, such as communicating (e.g., TX and RX) over an antenna.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "selecting," "determining," "receiving," "forming," "grouping," "aggregating," "generating," "removing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing discussion merely describes some exemplary aspects of the present invention. One skilled in the art will readily recognize from such discussion, the accompanying drawings and the claims that various modifications can be made without departing from the spirit and scope of the invention.

What is claimed is:

1. A method performed by network equipment in a 5G new radio (NR) in a licensed or an unlicensed spectrum environment, comprising:
   generating a downlink control information (DCI) message containing an indication of a physical uplink control channel (PUCCH) resource for a UE to use to transmit a dynamic scheduling request (SR);
   polling the UE by transmitting the DCI that includes the PUCCH resource which is dynamically updated based on one or more network conditions including network traffic, location of one or more UE, or which of the one or more UE have data to transmit, wherein polling the UE comprises, in response to a failure associated with listen before talk (LBT), including a plurality of PUCCH resources in the DCI;
   receiving the dynamic SR in a PUCCH message that is transmitted according to the PUCCH resource; and
   transmitting an uplink (UL) grant determined based on the dynamic SR.

2. The method of claim 1, wherein the DCI is transmitted over a channel during a specified channel occupancy time (COT).

3. The method of claim 1, further comprising transmitting configuration information to a user equipment (UE) that indicates how to find the DCI, wherein the configuration information defines the DCI as positioned relative to numerology.

4. The method of claim 1, further comprising transmitting configuration information to a user equipment (UE) that indicates how to find the DCI, wherein the configuration information defines the DCI as being part of downlink burst signaling.

5. The method of claim 1, wherein the DCI includes a PUCCH resource indicator (PRI) having a bit field that indicates the PUCCH resource to be used for the dynamic SR.

6. A base station comprising a processor (or processing circuitry) configured to perform operations comprising:
    generating a downlink control information (DCI) message containing an indication of a physical uplink control channel (PUCCH) resource for a UE to use to transmit a dynamic scheduling request (SR);
    polling the UE by transmitting the DCI that includes the PUCCH resource which is dynamically updated based on one or more network conditions including network traffic, location of one or more UE, or which of the one or more UE have data to transmit, wherein polling the UE comprises, in response to a failure associated with listen before talk (LBT) including a plurality of PUCCH resources in the DCI;
    receiving the dynamic SR in a PUCCH message that is transmitted according to the PUCCH resource; and
    transmitting an uplink (UL) grant determined based on the dynamic SR.

7. The base station of claim 6, wherein the dynamic SR is multiplexed with a hybrid automatic repeat request (HARQ) transmission.

8. The base station of claim 6, wherein the UE is one of the one or more UE, and the DCI includes a plurality of bit fields, each bit field being assigned to a corresponding one of the one or more UE.

9. The base station of claim 6, wherein UL resources including beam and time scheduling that are include in the UL grant is determined based on information contained in the dynamic SR including one or more of: a beam, a listen before talk (LBT) band, a time slot to transmit, and bandwidth parts (BWPs).

10. The base station of claim 6, wherein a time interval is enforced between receiving the dynamic SR and transmitting the UL grant to be greater than or equal to a larger of a) a time required to change from one beam to another, or b) a processing time.

11. A baseband processor, configured to perform operations comprising:
    generating a downlink control information (DCI) message containing an indication of a physical uplink control channel (PUCCH) resource for a UE to use to transmit a dynamic scheduling request (SR);
    polling the UE by transmitting the DCI that includes the PUCCH resource which is dynamically updated based on one or more network conditions including network traffic, location of one or more UE, or which of the one or more UE have data to transmit, wherein polling the UE comprises, in response to a failure associated with listen before talk (LBT), including a plurality of PUCCH resources in the DCI;
    receiving the dynamic SR in a PUCCH message that is transmitted according to the PUCCH resource; and
    transmitting an uplink (UL) grant determined based on the dynamic SR.

12. The baseband processor of claim 11, wherein the DCI is transmitted over a channel during a specified channel occupancy time (COT).

13. The baseband processor of claim 11, the operations further comprising transmitting configuration information to a user equipment (UE) that indicates how to find the DCI, wherein the configuration information defines the DCI as positioned relative to numerology.

14. The baseband processor of claim 11, the operations further comprising transmitting configuration information to a user equipment (UE) that indicates how to find the DCI, wherein the configuration information defines the DCI as being part of downlink burst signaling.

15. The baseband processor of claim 11, wherein the DCI includes a PUCCH resource indicator (PRI) having a bit field that indicates the PUCCH resource to be used for the dynamic SR.

16. The baseband processor of claim 11, wherein the dynamic SR is multiplexed with a hybrid automatic repeat request (HARQ) transmission.

17. The baseband processor of claim 11, wherein the dynamic SR includes channel state information (CSI).

18. The baseband processor of claim 11, wherein the UE transmits the dynamic SR if when the PUCCH resource is successfully found, but does not transmit the dynamic SR if when the PUCCH resource is not successfully found.

19. The baseband processor of claim 11, wherein UL resources including beam and time scheduling that are included in the UL grant are determined based on information contained in the dynamic SR including one or more of: a beam, a listen before talk (LBT) band, a time slot to transmit, and bandwidth parts (BWPs).

20. The baseband processor of claim 11, wherein a time interval is enforced between receiving the dynamic SR and transmitting the UL grant to be greater than or equal to a larger of a) a time required to change from one beam to another, or b) a processing time.

* * * * *